US006590057B1

(12) United States Patent
Brecht et al.

(10) Patent No.: US 6,590,057 B1
(45) Date of Patent: Jul. 8, 2003

(54) POLYURETHANE ELASTOMERS, PROCESS FOR THEIR PRODUCTION AND USE THEREOF

(75) Inventors: Klaus Brecht, Burscheid (DE); Wolfgang Grimm, Leverkusen (DE); Stephan Schleiermacher, Brühl (DE); Marc Schütze, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/228,535

(22) Filed: Aug. 27, 2002

(30) Foreign Application Priority Data

Aug. 29, 2001 (DE) .......................................... 101 42 296

(51) Int. Cl.$^7$ .................. C08G 18/18; C08G 18/22; C08G 18/48; C08J 9/04
(52) U.S. Cl. ..................... 528/52; 521/123; 521/124; 521/125; 521/128; 521/129; 521/174; 521/176; 521/137; 525/123; 525/453; 525/455; 528/53; 528/54; 528/55; 528/56; 528/57; 528/76; 528/77; 36/25 R
(58) Field of Search ................................ 521/123, 124, 521/125, 128, 129, 174, 176, 137; 528/52, 53, 54, 55, 56, 57, 76, 77; 525/123, 453, 455; 36/25 R

(56) References Cited

U.S. PATENT DOCUMENTS

| 2,894,919 A | 7/1959 | Simon et al. ................. 521/157 |
| 3,108,975 A | 10/1963 | Lambert et al. ............. 521/110 |
| 3,634,345 A | 1/1972 | Diehr et al. ................. 521/117 |
| 3,940,517 A | 2/1976 | DeLeon ....................... 427/373 |
| 4,107,069 A | 8/1978 | Keller et al. ................. 252/182 |
| 4,256,847 A | 3/1981 | Spector ....................... 521/117 |
| 4,837,245 A | 6/1989 | Streu et al. .................. 521/117 |
| 5,084,485 A | 1/1992 | Heilig et al. ................. 521/125 |
| 5,162,382 A | 11/1992 | Carswell et al. .............. 521/51 |
| 5,478,790 A | 12/1995 | Norby et al. ................ 502/300 |
| 5,587,448 A | 12/1996 | Engen ........................... 528/55 |
| 5,733,945 A | 3/1998 | Simpson ..................... 521/124 |
| 5,792,811 A | 8/1998 | Bhat ........................... 524/590 |
| 5,859,165 A | 1/1999 | Bossert et al. ................ 528/58 |
| 5,902,835 A | 5/1999 | Meier et al. ................. 521/125 |
| 5,910,373 A | 6/1999 | Bossert et al. .............. 428/457 |
| 5,952,053 A | 9/1999 | Colby .......................... 427/393 |
| 5,955,609 A | 9/1999 | Slack et al. .................. 544/222 |
| 6,001,900 A | 12/1999 | Bossert et al. .............. 523/410 |
| 6,124,380 A | 9/2000 | Bossert et al. .............. 523/404 |
| 6,127,308 A | 10/2000 | Slack et al. .................. 502/170 |
| 6,190,524 B1 | 2/2001 | Kollah et al. ............... 204/489 |
| 6,191,216 B1 | 2/2001 | Ganster et al. ............. 524/779 |
| 6,242,555 B1 | 6/2001 | Du Prez et al. ............... 528/52 |
| 6,353,057 B1 | 3/2002 | He et al. ..................... 525/124 |

FOREIGN PATENT DOCUMENTS

| CA | 2049695 | 2/1993 |
| DE | 39 16 873 | 12/1989 |
| EP | 0 603 597 | 6/1994 |
| WO | 98/15585 | 4/1998 |
| WO | 00/46306 | 8/2000 |

OTHER PUBLICATIONS

CA:108:56652, "Catalysis of diol prepellant binder cure reactions with isocyanates".
Appl. Polym. Sci., 65(6), 1997, pp. 1217–1225, Shan–Guo Luo, Hui–Min Tan.
Jian–Guo Zhang, YiJie Wu, Feng–Kui Pei, Xiang–Hong Meng, "Catalytic Mechanisms os Triphenyl Bismuth, Dibutyltin Dilaurate, and Their Combination in Polyurethane–Forming Reaction".
Polyurethanes Chemistry and Technology, Part 1, J.H. Saunder and K.C. Frisch, pp. 167–168, "Kinetics and Catalysis of Reactions".

*Primary Examiner*—Rabon Sergent
(74) *Attorney, Agent, or Firm*—Joseph C. Gil; John E. Mrozinski, Jr.; Jennifer R. Seng

(57) ABSTRACT

The invention provides polyurethane elastomers (PU elastomers), a process for their production using special catalyst mixtures and their use in particular for the manufacture of shoe soles.

12 Claims, No Drawings

POLYURETHANE ELASTOMERS, PROCESS FOR THEIR PRODUCTION AND USE THEREOF

FIELD OF THE INVENTION

The invention is directed to polyurethane elastomers (PU elastomers), a process for their production with special catalyst mixtures and uses thereof.

BACKGROUND OF THE INVENTION

PU elastomers have long been known and have already been customized for a wide variety of applications, see for example U.S. Pat. No. 5,952,053. In order to control their polymerization rates, a large number of diverse metal catalysts have been investigated and used. In addition to the widespread use of organotin compounds, it is also known to use organic compounds or organic salts of various other elements, such as lithium, titanium and bismuth.

The use of lithium salts of organic acids has also been described. Mixtures of a lithium carboxylate, namely lithium neodecanoate, lithium octanoate, lithium stearate or lithium naphthenate, and a zinc carboxylate are described in U.S. Pat. No. 4,256,847 as an effective catalyst combination for rigid foam applications. Lithium is known to be highly active. Other publications list lithium as the sole metal catalyst for the catalysis of PU reactions. In U.S. Pat. No. 4,107,069, lithium carboxylates are used as stable gel catalysts for rigid PU foams. U.S. Pat. No. 3,108,975 discloses their use as catalysts for rigid and flexible, as well as, cellular and non-cellular polyurethanes. The use of lithium carboxylates as a trimerization catalyst is likewise known, in fact in U.S. Pat. No. 3,634,345, moisture-insensitive, readily soluble aromatic carboxylates are used for PU resin production. in U.S. Pat. No. 3,940,517 aliphatic lithium carboxylates are used for PU foams and in U.S. Pat. Nos. 6,127,308 and 5,955,609, the controllability of the trimerization reaction is used for PU foams and prepolymer synthesis. The same procedure is used in the production of rigid foams in DE-A 59 101 001. Finally, in U.S. Pat. No. 2,894,919, lithium carboxylates, namely lithium stearate and lithium caprylate, are used as catalysts in order to produce exclusively elastic, flexible PU foams.

Organic titanium compounds have been used since the 1960's as catalysts for the synthesis of polyurethanes, such as those listed in U.S. Pat. No. 5,902,835. Known organic titanium compounds include, titanium carboxylates, as disclosed in U.S. Pat. No. 5,162,382, alkyl titanates, as disclosed in Saunders, J. H.; Frisch, K. C. *Polyurethanes—Chemistry and Technology* (1962) London Part I p. 168, JP 2 001/026 629, JP 5 097 952 and titanium diketonates and titanium β-keto esters, as disclosed in U.S. Pat. No. 5,902, 835, DE-A 19 626 007, WO 98/15585, Chemical Abstract, Vol. 108:56652. Organic titanium compounds are commonly used as expansion and gel catalysts. Their range of applications extends from water-expanded PU foams and mechanically foamed, thermally curing PU foams to PU surface coatings to RIM systems for flexible PU foams.

Organic bismuth compounds are also known to be used as catalysts, see for example, Luo, S.-G.; Tan, H.-M.; Zhang, J.-G.; Wu, Y.-J.;

Pei, F.-K.; Meng, X.-H. J. Appl. Polym. Sci. (1997) 65(6), p. 1217–1225. Of the group of organic bismuth compounds, carboxylates are predominantly used, as disclosed in CA-A 2 049 695, DE-A 19 618 825, U.S. Pat. No. 5,792,811, and WO 2000/47642. In addition, bismuth organothiolates are used as latent catalysts, see for example, WO 95/29007 and U.S. Pat. Nos. 5,910,373, and 6,190,524. The use of bismuth compounds together with organic zinc or tin compounds is also known, see for example WO 96/20967, U.S. Pat. Nos. 5,910,373, 6,001,900, 5,859,165, 6,124,380 and 6,190,524, WO 98/14492 and WO 2000/46306. The field of application for the use of bismuth catalysts mentioned above is mainly in the area of surface coating.

In addition to the combinations of metal catalysts already mentioned, such as e.g. tin and zinc compounds, a number of catalyst combinations comprising organic compounds, of the elements, lithium, titanium or bismuth can also be found in the literature. U.S. Pat. Nos. 5,952,053, 5,952,053 and WO 2000/46306 list combinations of lithium and bismuth compounds and U.S. Pat. No. 5,902,835 discloses that organic titanium compounds can be combined with bismuth compounds, however these metal catalyst combinations display no special effects.

Shoe soles, among other things, are an important application for PU elastomers. The catalyst systems used in their production must provide for good processability of the soles. Specifically, this includes short demolding times and high demolding hardness values, as well as, long cream times, to ensure that every part of the mold is filled. The catalysts must also promote good end properties, such as high final hardness values and low puncture expansion values under repeated flexural stress. Commercial organotin catalysts do not satisfy this list of requirements.

SUMMARY OF THE INVENTION

An object of the present invention is to provide PU elastomers having high final hardness values and low puncture expansion values under repeated flexural stress, as well as a process, in which short demolding times, high demolding hardness values and long cream times are possible.

Surprisingly this object can be achieved with special catalyst combinations containing lithium and titanium compounds or organic lithium, titanium and bismuth compounds. In the case of a three-component mixture, the concentration of catalyst used can also be reduced, in comparison to the two-component mixture, with an otherwise identical effect, giving rise, in addition, to toxicological and economic advantages.

DETAILED DESCRIPTION OF THE INVENTION

The invention provides polyurethane elastomers produced by reacting
a) organic diisocyanates and/or polyisocyanates with
b) at least one polyether polyol having a number-average molecular weight of 800 g/mol to 25,000 g/mol, preferably 800 to 14,000 g/mol, more preferably 2,000 to 9,000 g/mol and having an average functionality of 1.6 to 2.4, preferably 1.8 to 2.4,
c) optionally at least a second polyether polyol differing from b) and having a number-average molecular weight of 800 g/mol to 25,000 g/mol, preferably 800 to 14,000 g/mol, more preferably 2,000 to 9,000 g/mol and having average functionalities of 2.4 to 8, more preferably 2.5 to 3.5,
d) optionally polymer polyols containing 1 to 50 wt. %, preferably 1 to 45 wt. % filler, relative to polymer polyol, and having hydroxyl values of 10 to 149 and average functionalities of 1.8 to 8, preferably 1.8 to 3.5,
e) optionally low-molecular chain extenders having average functionalities of 1.8 to 2.1, preferably 2, and having molecular weights of 750 g/mol and lower, preferably 18 g/mol to 400 g/mol, more preferably 60 g/mol to 300 g/mol, and/or crosslinking agents having average functionalities of 3 to 4, preferably 3, and having molecular weights of up to 750 g/mol, preferably 18 g/mol to 400 g/mol, particularly preferably 60 g/mol to 300 g/mol, in the presence of f) amine catalysts and a catalyst mixture containing
   i) at least one organic titanium and/or zirconium compound,
   ii) and at least one organic lithium carboxylate,
   iii) optionally additionally at least one organic bismuth carboxylate,
g) optionally blowing agents, and
h) optionally additives, wherein the ratio of the amount of substance $n_{Ti}$ of titanium ions and/or $n_{Zr}$ of zirconium ions in component i) to the amount of substance $n_{Li}$ of lithium ions in component ii) is 0.2 to 4, preferably 0.43 to 1.5 and if component iii) is used the ratio of the amount of substance $n_{Bi}$ of bismuth ions in component iii) to the sum of the amounts of substance $n_{Ti}$ and/or $n_{Zr}$ and $n_{Li}$ is 0.0001 to 0.53, preferably 0.0001 to 0.24, more preferably 0.0001 to 0.15.

The PU elastomers are preferably produced by the prepolymer process, whereby in the first step a polyaddition adduct, having isocyanate groups, is produced from at least a portion of the polyether polyol b) or a mixture thereof, with polyol component c) and at least one diisocyanate or polyisocyanate a). In the second step solid PU elastomers can be produced from prepolymers having such isocyanate groups, by the reaction with low-molecular weight chain extenders and/or crosslinking agents d) and/or the remaining portion of the polyol components b) and optionally c). If water or another blowing agent, or mixtures thereof, are additionally used in the second step, microcellular PU elastomers can be produced.

Aliphatic, cycloaliphatic, araliphatic, aromatic and heterocyclic polyisocyanates, such as those described by W. Siefken in Justus Liebigs Annalen der Chemie, 562, pages 75 to 136, are suitable as starting component a) for the process according to the present invention, for example those having the formula:

Q(NCO)$_n$ in which n denotes 2–4, preferably 2, and Q denotes an aliphatic hydrocarbon radical with 2 to 18, preferably 6 to 10 C atoms, a cycloaliphatic hydrocarbon radical with 4 to 15, preferably 5 to 10 C atoms, an aromatic hydrocarbon radical with 6 to 15, preferably 6 to 13 C atoms, or an araliphatic hydrocarbon radical with 8 to 15, preferably 8 to 13 C atoms. Suitable examples include ethylene diisocyanate, 1,4-tetramethylene diisocyanate, 1,6-hexamethylene diisocyanate (HDI), 1,12-dodecane. diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl cyclohexane, 2,4- and 2,6- hexahydrotoluene diisocyanate and any mixtures of these isomers, hexahydro-1,3-and -1,4-phenylene diisocyanate, perhydro-2,4'- and 4,4'-diphenylmethane diisocyanate, 1,3- and 1,4-phenylene diisocyanate, 1,4-durene diisocyanate (DDI), 4,4'-stilbene diisocyanate, 3,3'-dimethyl4,4'-biphenylene diisocyanate (TODI), 2,4- and 2,6-toluene diisocyanate (TDI) and any mixtures of these isomers, diphenylmethane-2,4'- and/or -4,4'-diisocyanate (MDI), or naphthylene-1,5-diisocyanate (NDI).

Other examples include, triphenylmethane-4,4',4''-triisocyanate, polyphenyl polymethylene polyisocyanates, such as those obtained by aniline-formaldehyde condensation and subsequent phosgenation and those described in GB-A 874 430 and GB-A 848 671, m- and p-isocyanatophenyl sulfonyl isocyanates according to U.S. Pat. No. 3,454,606, perchlorinated aryl polyisocyanates, such as those described in U.S. Pat. No. 3,277,138, polyisocyanates having carbodiimide groups, such as those described in U.S. Pat. No. 3,152,162 and in DE-A 25 04 400, DE-A 25 37 685 and DE-A 25 52 350, norbornane diisocyanates according to U.S. Pat. No. 3,492,301, polyisocyanates having allophanate groups, such as those described in GB-A 994 890, BE-A 761 626 and NL-A 7 102 524, polyisocyanates having isocyanurate groups, such as those described in U.S. Pat. No. 3,001,9731, in DE-A 10 22 789, DE-A 12 22 067 and DE-A 1 027 394, as well as in DE-A 1 929 034 and DE-A 2 004 048, polyisocyanates having urethane groups, such as those described in BE-A 752 261 or in U.S. Pat. No. 3,394,164 and DE-A 3 644 457, polyisocyanates having acylated urea groups according to DE-A 1 230 778, polyisocyanates having biuret groups, such as those described in U.S. Pat. Nos. 3,124,605, 3,201,372 and U.S. Pat. No. 3,124,605 and in GB-A 889 050, polyisocyanates produced by telomerization reactions, such as those described in U.S. Pat. No. 3,654,106, polyisocyanates having ester groups, such as those cited in GB-A 965 474 and GB-A 1 072 956, in U.S. Pat. No. 3,567,763 and in DE-A 12 31 688, reaction products of the above-mentioned isocyanates with acetals according to DE-A 1 072 385 and polyisocyanates containing polymeric fatty acid esters according to U.S. Pat. No. 3,455,883.

The distillation residues having isocyanate groups that are obtained during industrial isocyanate production, optionally dissolved in one or more of the aforementioned polyisocyanates, can also be used. It is also possible to use any mixture of the aforementioned polyisocyanates. Polyisocyanates that are readily accessible in industry are preferably used, for example 2,4- and 2,6-toluene diisocyanate and any mixtures of these isomers ("TDI"), 4,4'-diphenylmethane diisocyanate, 2,4'-diphenylmethane diisocyanate, 2,2'-diphenylmethane diisocyanate and polyphenyl polymethylene polyisocyanates, such as are produced by aniline-formaldehyde condensation and subsequent phosgenation ("crude MDI"), and polyisocyanates having carbodiimide groups, uretonimine groups, urethane groups, allophanate groups, isocyanurate groups, urea groups or biuret groups ("modified polyisocyanates"), in particular modified polyisocyanates that are derived from 2,4- and/or 2,6-toluene diisocyanate or from 4,4'- and/or 2,4'-diphenylmethane diisocyanate. Naphthylene-1,5-diisocyanate and mixtures of the cited polyisocyanates are also suitable.

Prepolymers having isocyanate groups that are produced by reacting at least a portion of the polyol component b) and/or c) and/or chain extenders and/or crosslinking agents e) with at least one aromatic diisocyanate from the group TDI, MDI, TODI, DIBDI, NDI, DDI, preferably with 4,4'-MDI and/or 2,4-TDI and/or 1,5-NDI, to form a polyaddition product, having urethane groups and isocyanate groups, and having an NCO content of 10 to 27 wt. %, preferably 12 to 25 wt. %, are preferably used.

As stated above, mixtures of components b), c) and e) can be used to produce the isocyanate group-containing prepolymers. Preferably, the prepolymers containing isocyanate groups are produced without chain extenders or crosslinking agents e).

Prepolymers having isocyanate groups can be produced in the presence of catalysts. It is also possible to produce the prepolymers in the absence of catalysts. However, the catalyst is incorporated into the reaction mixture for production of the PU elastomers.

Suitable polyether polyols b) or c) useful for production of the elastomers, according to the present invention, can be produced by known methods, for example by polyinsertion via DMC catalysis of alkylene oxides, by anionic polymerization of alkylene oxides in the presence of alkali hydroxides or alkali alcoholates as catalysts and with the addition of at least one initiator molecule containing 2 to 6, preferably 2 to 4 reactive hydrogen atoms in bonded form, or by cationic polymerization of alkylene oxides in the presence of Lewis acids such as antimony pentachloride or boron fluoride etherate. Suitable alkylene oxides contain 2 to 4 carbon atoms in the alkylene radical. Examples include tetrahydrofuran, 1,2-propylene oxide, 1,2- or 2,3-butylene oxide; ethylene oxide and/or 1,2-propylene oxide are preferably used. The alkylene oxides can be used individually, in succession or as a mixture. Mixtures of 1,2-propylene oxide and ethylene oxide are preferably used, whereby the ethylene oxide is used in quantities of 10 to 50% as an ethylene oxide terminal block ("EO cap") so that the resulting polyols display over 70% primary OH terminal groups. Examples of initiator molecules include water or dihydric and trihydric alcohols, such as ethylene glycol, 1,2-propanediol and 1,3-propanediol, diethylene glycol, dipropylene glycol, ethane-1,4-diol, glycerol, trimethylol propane, etc. Suitable polyether polyols, preferably polyoxypropylene polyoxyethylene polyols, have average functionalities of 1.6 to 2.4, preferably 1.8 to 2.4, and number-average molecular weights of 800 g/mol to 25,000 g/mol, preferably 800 to 14,000 g/mol, particularly preferably 2,000 to 9,000 g/mol.

Difunctional or trifunctional polyether polyols having a number-average molecular weight of 800 to 25,000, preferably 800 to 14,000 g/mol, more preferably 2,000 to 9,000 g/mol, are used as components b) or c) in the production of the elastomers according to the present invention.

Also suitable as polymer polyols d), in addition to the above-mentioned polyether polyols, are polymer-modified polyether polyols, preferably graft polyether polyols, in particular those based on styrene and/or acrylonitrile that are produced by in-situ polymerization of acrylonitrile, styrene or preferably mixtures of styrene and acrylonitrile, in a ratio by weight of 90:10 to 10:90, preferably 70:30 to 30:70, and polyether polyol dispersions which contain as disperse phase, in quantities of 1 to 50 wt. %, preferably 1 to 45 wt. %, relative to polymer polyol, inorganic fillers, polyureas (PHD), polyhydrazides, polyurethanes containing tert.-amino groups in bonded form and/or melamine, for example.

Low-molecular difunctional chain extenders, trifunctional or tetrafunctional crosslinking agents or mixtures of chain extenders and crosslinking agents can additionally be used as component e) to produce the PU elastomers according to the present invention.

Such chain extenders and crosslinking agents e) are used to modify the mechanical properties, in particular the hardness of the PU elastomers. Suitable chain extenders include alkane diols, dialkylene glycols and polyalkylene polyols, and crosslinking agents, such as trihydric or tetrahydric alcohols and oligomeric polyalkylene polyols with a functionality of 3 to 4 and molecular weights<750 g/mol, preferably from 18 to 400 g/mol, more preferably from 60 to 300 g/mol. Alkane diols having 2 to 12, preferably 2, 4 or 6 carbon atoms, such as ethanediol, 1,6-hexanediol, 1,7-heptanediol, 1,8-octanediol, 1,9-nonanediol, 1,10-decanediol and in particular 1,4-butanediol, and dialkylene glycols having 4 to 8 carbon atoms, such as diethylene glycol and dipropylene glycol as well as polyoxyalkylene glycols, are preferably used as chain extenders. Also suitable are branched-chain and/or unsaturated alkane diols with no more than 12 carbon atoms, such as 1,2-propanediol, 2-methyl-1,3-propanediol, 2,2-dimethyl-1,3-propanediol, 2-butyl-2-ethyl-1,3-propanediol, 2-butene-1,4-diol and 2-butyne-1,4-diol, diesters of terephthalic acid with glycols having 2 to 4 carbon atoms, such as terephthalic acid-bis-ethylene glycol or terephthalic acid-bis-1,4-butanediol, hydroxyalkylene ethers of hydroquinone or resorcinol, e.g. 1,4-di(β-hydroxyethyl) hydroquinone or 1,3-(β-hydroxyethyl) resorcinol, alkanolamines with 2 to 12 carbon atoms such as ethanolamine, 2-aminopropanol and 3-amino-2,2-dimethyl propanol, N-alkyl dialkanolamines, such as N-methyl and N-ethyl diethanolamine, (cyclo)aliphatic diamines with 2 to 15 carbon atoms, such as 1,2-ethylene diamine, 1,3-propylene diamine, 1,4-butylene diamine and 1,6-hexa-methylene diamine, isophorone diamine, 1,4-cyclohexamethylene diamine and 4,4'-diaminodicyclohexyl methane, N-alkyl-substituted, N,N'-dialkyl-substituted and aromatic diamines, which can also be substituted at the aromatic radical by alkyl groups, having 1 to 20, preferably 1 to 4 carbon atoms in the N-alkyl radical, such as N,N'-diethyl, N,N'-di-sec.-pentyl, N,N'-di-sec.-hexyl, N,N'-di-sec.-decyl and N,N'-dicyclohexyl (p- or m-) phenylene diamine, N,N'-dimethyl, N,N'-diethyl, N,N'-diisopropyl, N,N'-di-sec.-butyl, N,N'-dicyclohexyl, -4,4'-diaminodiphenylmethane, N,N'-di-sec.-butyl benzidine, methylene bis(4-amino-3-methyl benzoate), 2,4-chloro-4,4'-diaminodiphenylmethane, 2,4- and 2,6-toluene diamine.

The compounds in component e) can be used in the form of mixtures or individually. Mixtures of chain extenders and crosslinking agents can also be used.

To adjust the hardness of the PU elastomers, components b), c), d) and e) can be varied in relatively broad proportions. For example, the hardness increases with the rising content of component e) in the reaction mixture.

The amounts of components b), c), d) and e) that are used to obtain the desired hardness in the PU elastomer can easily be determined by experiment. For example, 1 to 50 parts by weight, preferably 2.5 to 20 parts by weight of the chain extender and/or crosslinking agent e), relative to 100 parts by weight of the higher-molecular compounds b), c) and d) can be used.

Amine catalysts that are familiar to a person skilled in the art can be used as component f), for example tertiary amines such as triethylamine, tributylamine, N-methyl morpholine, N-ethyl morpholine, N,N,N',N'-tetramethyl ethylene diamine, pentamethyl diethylene triamine and higher homologues, according to DE-A 26 24 527 and DE-A 26 24 528, 1,4-diazabicyclo-[2,2 ,2]-octane, N-methyl-N'-dimethylaminoethyl piperazine, bis(dimethylaminoalkyl) piperazine, N,N-dimethyl benzylamine, N,N-dimethyl cyclohexylamine, N,N-diethyl benzylamine, bis(N,N-diethylaminoethyl) adipate, N,N,N',N'-tetramethyl-1,3-butane diamine, N,N-dimethyl-β-phenyl ethylamine, bis(dimethylaminopropyl) urea, bis(dimethylaminopropyl) amine, 1,2-dimethyl imidazole, 2-methyl imidazole, mono-cyclic and bicyclic amidines, bis(dialkylamino) alkyl ethers, such as e.g. bis(dimethylaminoethyl) ethers, and tertiary amines having amide groups (preferably formamide groups) according to DE-A 25 23 633 and DE-A 27 32 292. Other examples of catalysts include known Mannich bases consisting of secondary amines, such as dimethylamine, and aldehydes, preferably formaldehyde, or ketones such as acetone, methyl ethyl ketone or cyclohexanone and phenols, such as phenol, nonyl phenol or bisphenol. Catalysts in the form of tertiary amines having hydrogen atoms that are active with respect to isocyanate groups are e.g. triethanolamine, triisopropanolamine, N-methyldiethanolamine, N-ethyl diethanolamine, N,N-dimethyl ethanolamine, reaction products thereof with alkylene oxides such as propylene oxide and/or ethylene oxide and secondary-tertiary amines according to DE-A 27 32 292. Silamines with carbon-silicon bonds, such as are described in U.S. Pat. No. 3,620,984, can also be used as catalysts, for example, 2,2,4-trimethyl-2-silamorpholine and 1,3-diethyl aminomethyl tetramethyl disiloxane. Other examples include nitrogen-containing bases such as tetraalkyl ammonium hydroxides, and also hexahydrotriazines. The reaction between NCO groups and Zerewitinoff-active hydrogen atoms is also accelerated by lactams and azalactams.

At least one organic carboxylate of lithium ii) with at least one organic compound of titanium and/or zirconium i) is preferably used as catalyst. If necessary the catalyst combination can be extended with at least one bismuth compound iii) as the third component. The catalysts can be added to the polyol formulation either as a prepared mixture or separately in the corresponding ratio. Separate addition is preferred.

Saturated or unsaturated, aliphatic or alicyclic and aromatic carboxylates of lithium that are familiar to the person skilled in the art can preferably be used as component ii). They correspond to the following general formulae:

[Li(OOCR)]

[Li$_2$((OOC)$_2$R)]

wherein R is a hydrocarbon radical with 1 to 25 carbon atoms. Preferred catalysts include lithium(I) versatate, tallate, oxalate, adipate and stearate. More preferred catalysts are lithium(I) naphthenate, decanoate, butyrate, isobutyrate, nonate, benzoate and caprioate. Lithium(I) neodecanoate, 2-ethyl hexanoate and octanoate are also preferred.

Component ii) can also a solution of a lithium hydroxide or carbonate or a solution of a mixture of these salts in one or more of the carboxylic acids described above.

Organic compounds of titanium and/or zirconium that are familiar to a person skilled in the art can be used as component i). They preferably correspond to the following general formulae:

[M(L$^1$)(L$^2$)(L$^3$)(L$^4$)]$_n$

[M(L$^1$)(L$^2$)(L$^3$)]$_n$

[M(L$^1$)(L$^2$)]$_n$

[M(L$^1$)]$_n$ wherein M denotes titanium and zirconium, n can assume values from 1 to 20 and L$^1$, L$^2$, L$^3$ and L$^4$ are the same or different and can be ligands of the following groups co-ordinated via O, S or N atoms:

(1) Alcoholates, phenolates, glycolates, thiolates, carboxylates or amino alcoholates containing 1 to 20 carbon atoms and optionally one or more functional groups (e.g. hydroxyl, amino, carbonylato, etc.) or having bonds containing oxygen, sulfur or nitrogen (such as, in ethers, thioethers, amines or carbonyls), (2) Various fluorine-free, sterically unhindered chelating ligands from the group of 1-diketones, such as benzoyl acetone, dibenzoyl methane, ethyl benzoyl acetate, methyl acetoacetate, ethyl acetoacetate and 2,4-pentane dione (also known as acetylacetone) and other chelating ligands, such as N,N-dimethyl ethanolamine, triethanolamine, salicylaldehyde, salicylamide, phenyl salicylate, cyclopentanone-2-carboxylic acid, bisacetyl acetylacetone, thioacetylacetone, N,N'-bis (salicylidene) ethylene diamine, glycolic acid, ethylene glycol etc.

Preferred components i) include titanium(IV) isopropoxide, titanium(IV)-n-butoxide, titanium(IV)-2-ethyl hexoxide, titanium(IV)-n-pentoxide, titanium(IV) (triethanolaminato) isopropoxide, titanium(IV) (triethanolaminato)-n-butoxide, isopropyl triisostearyl titanate, bis(8-quinolinolato) titanium(IV) dibutoxide, bis (ethyl acetoacetato) titanium(IV) diisobutoxide, titanium (IV) bis(ethyl acetoacetato) diisopropoxide, zirconium(IV) isopropoxide, zirconium(IV)-n-butoxide, zirconium(IV)-2-ethyl hexoxide, zirconium(IV)-n-pentoxide, zirconium(IV) (triethanolaminato) isopropoxide, zirconium(IV) (triethanolaminato)-n-butoxide, isopropyl triisostearyl zirconate, bis(8-quinolinolato) zirconium(IV) dibutoxide and bis(ethyl acetoacetato) zirconium(IV) diisobutoxide.

More preferred are titanium compounds with ligands such as those listed in paragraph (2) above. Of these titanium compounds, titanium(IV) diisopropoxide-bis(2,4-pentane dionate), titanium(IV) triisopropoxide (2,4-pentane dionate), ethoxy-bis(pentane-2,4-dionato-0,0')(propan-2-olato) titanium, titanium(IV) oxide acetylacetonate, bis (diacetylacetonato) titanium(IV) butoxide isopropoxide and bis(diacetylacetonato) titanium(IV) ethoxide isopropoxide are preferably used.

Many of the catalysts listed under i) can form agglomerates and/or higher-molecular condensation products having two or more metal sites, which are connected with one another by one or more bridging ligands. For that reason n can vary from 1 to approximately 20. Compounds having n between 1 and 10 are preferred.

Component iii) contains saturated or unsaturated, aliphatic or alicyclic and aromatic bismuth carboxylates and preferably correspond to the following general formulae:

[Bi(OOCR)$_3$]

[Bi$_2$((OOC)$_2$R)$_3$]

wherein R is a hydrocarbon radical having 1 to 25 carbon atoms.

Preferred carboxylates include bismuth(III) versatate, tallate, stearate, adipate, oxalate. Bismuth(III) naphthenate, decanoate, butyrate, isobutyrate, nonate, capriote are also preferred. Bismuth(III) neodecanoate, -2-ethyl hexanoate and octanoate are more preferred.

Components i), ii) and/or iii) are preferably used as liquid preparations with one or more solvents. Saturated or unsaturated, aliphatic or alicyclic and aromatic carboxylic acids having the general formulae:

RCOOH

HOOC—R—COOH can be used as solvent, wherein R is a hydrocarbon radical having 1 to 25 carbon atoms. Neodecanoic acid, 2-ethyl hexanoic acid and naphthenic acid, for example, are preferred.

In place of the aforementioned carboxylic acids, the following solvents can also be used:

(1) Aliphatic and aromatic liquids, such as Stoddard solvents, naphtha, white spirit, petroleum spirits, xylene, hexane, heptane, toluene and paraffinic mineral oil, (2) Esters, such as ethyl acetate and isopropyl acetate,
(3) Alcohols, such as ethanol, n-propanol, isopropanol, n-butanol, 2-(2-butoxyethoxy) ethanol, 2-(2-ethoxyethoxy) ethanol, diethylene glycol, triethylene glycol, diethylene glycol monoethyl ether, ethylene glycol,
(4) Ketones, such as methyl ethyl ketone, acetone and
(5) Ethers, such as diethylene glycol butyl ether
(6) and water.

The catalyst combinations of components i) and ii) or i), ii) and iii) are generally used in a quantity of between approximately 0.001 and 10 wt. %, preferably 0.01 to 0.5 wt. %, relative to the total amount of compounds from b) to h).

The catalyst combinations of components i) and ii) are mixed in a ratio of the amount of substance $n_{Ti}$ of titanium ions and/or $n_{Zr}$ of zirconium ions in component i) to the amount of substance $n_{Li}$ of lithium ions in component ii) such that values of 0.2 to 4, preferably 0.43 to 1.5 are established. If component iii) is additionally used, component iii) is used in an amount of substance $n_{Bi}$ of bismuth ions in component iii) such that the ratio of the amount of substance $n_{Bi}$ of bismuth ions in component i) to the sum of $n_{Ti}$ and/or $n_{Zr}$ and $n_{Li}$ is 0.0001 to 0.53, preferably 0.0001 to 0.24, more preferably 0.0001 to 0. 15.

In the absence of moisture and physically or chemically acting blowing agents, compact PU elastomers, for example, PU shoe outer soles can be produced.

In the production of microcellular PU elastomers, water is preferably used as blowing agent g), which reacts in situ with the organic diisocyanates and/or polyisocyanates or with the prepolymers a) having isocyanate groups to form carbon dioxide and amino groups, which in turn undergo further reaction with other isocyanate groups to form urea groups, thereby acting as chain extenders.

When water is added to the polyurethane formulation to establish the desired density, it is used in quantities from 0.001 to 3.0 wt. %, preferably 0.01 to 2.0 wt. % and in particular 0.05 to 0.7 wt. %, relative to the weight of components a), b) and optionally c), d) and e).

As blowing agent g), gases or highly volatile inorganic or organic substances which evaporate under the influence of the exothermic polyaddition reaction and preferably have a boiling point under normal pressure ranging from −40 to 120° C., preferably −30 to 90° C., can also be used as physical blowing agents in place of water or preferably in combination with water. Examples include acetone, ethyl acetate, halogen-substituted alkanes or perhalogenated alkanes, such as (R134a, R141b, R365mfc, R245fa), also butane, pentane, cyclopentane, hexane, cyclohexane, heptane or diethyl ether as organic blowing agents, and air, $CO_2$ or $N_2O$ as inorganic blowing agents.

An expansion effect can also be achieved by adding compounds that decompose at temperatures above room temperature with release of gases such as nitrogen and/or carbon dioxide, such as azo compounds, for example, azodicarbonamide or azoisobutyric acid nitrile, or salts such as ammonium bicarbonate, ammonium carbamate or ammonium salts of organic carboxylic acids, e.g. monoammonium salts of malonic acid, boric acid, formic acid or acetic acid. Further examples of blowing agents and details of the use of blowing agents are described in R. Vieweg, A. Höchtlen (Eds.): "Kunststoff-Handbuch", Volume VII, Carl-Hanser-Verlag, Munich, $3^{rd}$ Edition, 1993, p. 115 to 118, 710 to 715.

The amount of solid blowing agents, low-boiling liquids or gases to be used, which in each case can be used alone or in the form of mixtures, such as liquid or gas mixtures or as gas-liquid mixtures, depending on the desired density and on the amount of water used. The desired amounts can easily be determined by experiment. Satisfactory results are delivered by amounts of solids of 0.5 to 35 wt. %, preferably 2 to 15 wt. %, amounts of liquids of 0.5 to 30 wt. %, preferably 0.8 to 18 wt. % and/or amounts of gases of 0.01 to 80 wt. %, preferably 10 to 50 wt. %, relative in each case to the weight of components a), b), c) d) and e). The introduction of gas, e.g. air, carbon dioxide, nitrogen and/or helium, can be achieved both through the higher-molecular polyhydroxyl compounds b), c) and d), through the low-molecular chain extender and/or crosslinking agent e) and through the polyisocyanates a) or through a) and b) and optionally c), d) and e).

Additives h) can optionally be added to the reaction mixture for production of compact or cellular PU elastomers. Examples that can be cited include surface-active additives, such as emulsifiers, foam stabilizers, cell regulators, flame retardants, nucleating agents, oxidation retarders, stabilizers, lubricants and mold release agents, dyes, dispersing agents and pigments. Examples of emulsifiers include the sodium salts of castor oil sulfonates or salts of fatty acids with amines such as oleic acid diethylamine or stearic acid diethanolamine. Alkali or ammonium salts of sulfonic acids such as dodecyl benzene sulfonic acid or dinaphthyl methane disulfonic acid for example or of fatty acids such as ricinoleic acid or of polymeric fatty acids can also additionally be used as surface-active additives. Examples of foam stabilizers include polyether siloxanes, preferably water-soluble examples. These compounds are generally structured so that a copolymer of ethylene oxide and propylene oxide is bonded with a polydimethyl siloxane radical. Such foam stabilizers are described in U.S. Pat. Nos. 2,834,748, 2 ,917, 480 and 3,629,308. Of particular interest are polysiloxane-polyoxyalkylene copolymers according to DE-A 25 58 523 that are multiply branched by means of allophanate groups. Also suitable are other organopolysiloxanes, oxyethylated alkyl phenols, oxyethylated fatty alcohols, paraffin oils, castor oil or ricinoleic acid esters, sulfated castor oil, peanut oil and cell regulators such as paraffins, fatty alcohols and polydimethyl siloxanes. Oligomeric polyacrylates with polyoxyalkylene and fluoroalkane radicals as side groups are also suitable for improving the emulsifying effect, dispersion of the filler, cell structure and/or stabilization. The surface-active substances are conventionally used in quantities of 0.01 to 5 parts by weight, relative to 100 parts by weight of the higher-molecular polyhydroxyl compounds b) and c). Reaction retarders, also pigments or dyes and flame retardants known per se, also stabilizers against the effects of aging and weathering, plasticizers and substances having fungistatic and bacteriostatic activity can also be added.

Other examples of surface-active additives and foam stabilizers as well as cell regulators, reaction retarders, stabilizers, flame-retardant substances, plasticizers, dyes and fillers and substances having fungistatic and bacteriostatic activity that can optionally additionally be used, as well as details of the mode of use and action of these additives are described in R. Vieweg, A. Höchtlen (Eds.): "Kunststoff-Handbuch", Volume VII, Carl-Hanser-Verlag, Munich, $3^{rd}$ Edition, 1993, p. 118 to 124.

To produce the PU elastomers according to the present invention the components are reacted in quantities so that the equivalent ratio of NCO groups in isocyanates a) to the sum of the isocyanate group-reactive hydrogens in components b), c), d) and e) and of any chemically acting blowing agents g) that may be used is 0.8:1 to 1.2:1, preferably 0.95:1 to 1.15:1 and more preferably 1.00:1 to 1.05:1.

The PU elastomers according to the present invention can be produced by the processes described in the literature, such as the one-shot or prepolymer process, with the aid of mixing devices that are known to a person skilled in the art. Preferably, the PU elastomers are produced by the prepolymer process.

In one embodiment of the production of the PU elastomers according to the invention the starting components are homogeneously mixed in the absence of blowing agents g), at a temperature of 20 to 80° C., preferably 25 to 60° C., the reaction mixture introduced into an open, optionally temperature-controlled mold and cured. In another variant of the production of the PU elastomers according to the invention the structural components are mixed in the presence of blowing agents g), preferably water, and introduced into the optionally temperature-controlled mold. After it has been filled the mold is closed and the reaction mixture is allowed to foam with packing. The degree of packing (ratio of molding density to free foam density) used is 1.05 to 8, preferably 1.1 to 6 and in particular 1.2 to 4, to form moldings. As soon as the moldings have sufficient strength they are demolded. The demolding times are dependent inter alia on the temperature and geometry of the mold and on the reactivity of the reaction mixture and are conventionally 1.5 to 15 minutes.

The PU elastomers according to the present invention have densities ranging from 180 to 1100 kg/m$^3$, depending inter alia on the content and type of filler. They are used for example in molded soles or in one-component direct soling systems with densities of 400 to 650 kg/m$^3$, in boot legs with densities of 500 to 700 kg/m$^3$, in tightly compressed or compact outer soles of two-layer soles or direct soling systems with densities of 800 to 1100 kg/m$^3$, in intermediate soles of two-layer soles or direct soling systems with densities of 400 to 500 kg/m$^3$ and in insoles with densities of 180 to 400 kg/m$^3$.

The PU elastomers according to the invention are especially valuable raw materials for shoe soles having a single or multi-layered construction.

The invention is explained in greater detail by means of the following examples.

EXAMPLES

The polyurethane specimens were produced by mixing the A component (Table 1) at 30° C. in a low-pressure foaming plant (ND1) with the B component (Table 2) at 30° C., pouring the mixture into a folding aluminum mold heated to 50° C. (size 200×140×10 mm), closing the folding mold and demolding the elastomer after 3 minutes.

From the elastomer sheets thus produced the Shore-A hardness (DIN 53 505) was determined directly after demolding and after storage for 24 h. The puncture expansion (DIN 53 522) of a 2 mm wide puncture in the bending line of specimens (measuring 2 cm×15 cm×1 cm) after 60,000 bending cycles was also determined. The results are set out in Tables 4 to 8.

Examples 1–5

The polyurethane elastomer was obtained by reacting 100 parts of the polyol formulation (A component, see Table 1) and 61 parts of the prepolymer (B component, see Table 2). The individual examples together with their physical and chemical properties are listed in Tables 4 to 8. The chemical names corresponding to the trade names of the catalysts and other components listed in the tables are set out in Table 3. In addition to the catalyst combinations according to the invention, experiments were also performed with metal compounds and mixtures not according to the invention for comparative purposes.

TABLE 1

Polyol formulation (A component)

| Wt. % | A component |
|---|---|
| Remainder up to 100 | Polyether diol b) (ratio by weight PO:EO 70:30; molecular weight 4000 g/mol) |
| 10 | Polyether triol c)) (ratio by weight PO:EO 78:22; molecular weight 6000 g/mol) |
| 10 | Butanediol e) |
| 0.2 | TELA e) |
| 0.5 | DABCO f) |
| Y | Catalysts and quantity (see Table 4) |
| 0.10 | DC-190 h) |
| 0.35 | Water g) |

TABLE 2

Formulation of the prepolymer (B component)

| Wt. % | B component |
|---|---|
| 66 | 4,4'-MDI a) |
| 5 | Polymeric MDI (29.8 wt. % NCO, functionality 2.1) a) |
| 29 | Mixture of tripropylene glycol and PO polyethers; number-average molecular weight 690 g/mol: functionality ~2 b) |

TABLE 3

Explanation of trade names/abbreviations

| Trade name or abbreviation | Chemical name |
|---|---|
| Tyzor ® AA 95 from DuPont | Bis(diacetylacetonato) titanium(IV) butoxide isopropoxide in butanol |
| Tyzor ® AA 105 from DuPont | Bis(diacetylacetonato) titanium(IV) ethoxide isopropoxide |
| Li 2 Hex-Cem ® from OMG (Ontokumpu Mooney Group) | Lithium-2-ethyl hexanoate in 2-(2-ethoxyethoxy) ethanol |
| Li Ten-Cem ® water sol. from OMG | Lithium neodecanoate in aqueous solution |
| DBTL | Dibutyl tin dilaurate |
| Coscat ® 83 from D. H. Erbslöh | Bismuth(III) neodecanoate |
| TELA | Triethanolamine |
| DABCO | Diaminobicyclooctane |
| DC-190 ® from Air Products | Foam stabilizer |

TABLE 4

Use of tin catalysts (prior art)

| Experiment | Tin catalyst Name | Amount in wt. % | Cream time in [sec] | Tack free time [sec] | Shore-A hardness determined × min after demolding | | | | Shore-A hardness 24 h after demolding | Puncture expansion in mm after b = 60,000 bends |
|---|---|---|---|---|---|---|---|---|---|---|
| | | | | | after 0 min | after 2 min | after 10 min | after 60 min | | |
| 1 | DBTL | 0.02 | 11 | 22 | 37 | 42 | 47 | 51 | 54 | 35000*/30000* 35000*/30000* |
| 2 | DBTL | 0.03 | 10 | 15 | 34 | 38 | 44 | 48 | 52 | 6.7/60000* |

All values marked with * indicate the number b of bends after which a test strip was broken.

TABLE 5

Use of Ti, Li and Bi catalysts with various ligands

| Experiment | Lithium component | | Titanium component | | Bismuth component | | [nTi:nLi] | nBi:(nTi + nLi) |
|---|---|---|---|---|---|---|---|---|
| | Name | Amount in wt. % | Name | Amount in wt. % | Name | Amount in wt. % | | |
| 3 | | | Tyzor AA 105 | 0.15 | | | | |
| 4 | Li-2-Hex Cem | 0.06 | Tyzor AA 105 | 0.09 | | | 1.38 | |
| 5 | Li Ten Cem | 0.15 | | | | | | |
| 6 | Li Ten Cem | 0.1 | Tyzor AA 95 | 0.1 | | | 0.25 | |
| 7 | Octa Soligen Lithium | 0.1 | Tyzor AA 95 | 0.1 | | | 0.85 | |
| 8 | Li stearate | 0.03 | Tyzor AA 95 | 0.04 | Coscat 83 | 0.02 | 1.83 | 0.7 |
| 9 | Li benzoate | 0.0014 | Tyzor AA 95 | 0.04 | Coscat 83 | 0.02 | 1.83 | 0.7 |
| 10 | Li-2-Hex Cem | 0.04 | Tyzor AA 95 | 0.04 | Bis-2-ethyl hexanoate 72% in mineral spirit | 0.014 | 0.92 | 0.07 |
| 11 | Li-2-Hex Cem | 0.04 | Tyzor AA 95 | 0.04 | Bis-2-ethyl hexanoate 72% in xylene | 0.014 | 0.92 | 0.07 |

| Experiment | Cream time in [sec] | Tack free time [sec] | Shore-A hardness determined × min after demolding | | | | Shore-A hardness 24 h after demolding | Puncture expansion in mm after b = 60,000 bends |
|---|---|---|---|---|---|---|---|---|
| | | | after 0 min | after 2 min | after 10 min | after 60 men | | |
| 3 | 11 | 17 | 30 | 35 | 45 | 54 | 56 | 4.1/3.2 |
| 4 | 11 | 24 | 33 | 38 | 46 | 52 | 54 | 2.9/2.2 |
| 5 | 11 | 33 | 25 | 30 | 39 | 43 | 48 | 4.3/6.2 |
| 6 | 11 | 20 | 28 | 42 | 49 | 52 | 54 | 1.8/3.6 |
| 7 | 12 | 27 | 45 | 40 | 48 | 52 | 52 | 1.8/2.9 |
| 8 | 9 | 22 | 31 | 35 | 45 | 50 | 54 | 2.4/1.2 |
| 9 | 9 | 24 | 32 | 36 | 46 | 51 | 53 | 60000*/55000* |
| 10 | 11 | 26 | 33 | 39 | 47 | 51 | 53 | 2.1/1.8 |
| 11 | 11 | 22 | 33 | 41 | 46 | 50 | 53 | 3.3/1.9 |

All values marked with * indicate the number b of bends after which a test strip was broken.

TABLE 6

Use of Ti and Li catalysts in various amounts

| Experiment | Lithium component | | Titanium component | | n[Ti:nLi] |
|---|---|---|---|---|---|
| | Name | Amount in wt. % | Name | Amount in wt. % | |
| 12 | Li-2-Hex Cem | 0.15 | | | |
| 13 | Li-2-Hex Cem | 0.12 | Tyzor AA 95 | 0.03 | 0.23 |
| 14 | Li-2-Hex Cem | 0.09 | Tyzor AA 95 | 0.06 | 0.61 |
| 15 | Li-2-Hex Cem | 0.075 | Tyzor AA 95 | 0.075 | 0.92 |
| 16 | Li-2-Hex Cem | 0.06 | Tyzor AA 95 | 0.09 | 1.38 |
| 17 | Li-2-Hex Cem | 0.03 | Tyzor AA 95 | 0.12 | 3.67 |
| 18 | | | Tyzor AA 95 | 0.15 | |

TABLE 6-continued

Use of Ti and Li catalysts in various amounts

| Experiment | Cream time in [sec] | Tack free time [sec] | Shore-A hardness measured × min after demolding | | | | Shore-A hardness 24 h after demolding | Puncture expansion in mm after b = 60,000 bends |
|---|---|---|---|---|---|---|---|---|
| | | | after 0 min | after 2 min | after 10 min | after 60 min | | |
| 12 | 15 | 44 | 29 | 34 | 43 | 51 | 52 | 45000*/4.3 |
| 13 | 12 | 32 | 35 | 39 | 48 | 53 | 54 | 2.5/7.6 |
| 14 | 12 | 23 | 38 | 41 | 50 | 55 | 55 | 2.8/4.5 |
| 15 | 11 | 23 | 38 | 42 | 51 | 55 | 56 | 4.1/4.2 |
| 16 | 11 | 21 | 36 | 41 | 50 | 54 | 55 | 3.5/4 |
| 17 | 10 | 20 | 35 | 41 | 50 | 53 | 55 | 4.1/4.5 |
| 18 | 11 | 18 | 34 | 39 | 49 | 53 | 56 | 12.6/6.7 |

All values marked with * indicate the number b of bends after which a test strip was broken.

TABLE 7

Use of Ti and Li catalysts in various amounts and Bi catalysts

| | Lithium component | | Titanium component | | Bismuth component | | | |
|---|---|---|---|---|---|---|---|---|
| Experiment | Name | Amount in wt. % | Name | Amount in wt. % | Name | Amount in wt. % | nTi:nLi | nBi:(nTi + nLi) |
| 19 | Li-2-Hex Cem | 0 | Tyzor AA 95 | 0.1 | Coscat 83 | 0.02 | | 0.27 |
| 20 | Li-2-Hex Cem | 0.02 | Tyzor AA 95 | 0.06 | Coscat 83 | 0.02 | 2.75 | 0.27 |
| 21 | Li-2-Hex Cem | 0.04 | Tyzor AA 95 | 0.04 | Coscat 83 | 0.02 | 0.92 | 0.26 |
| 22 | Li-2-Hex Cem | 0.06 | Tyzor AA 95 | 0.02 | Coscat 83 | 0.02 | 0.31 | 0.26 |
| 23 | LI-2-Hex Cem | 0.08 | Tyzor AA 95 | 0 | Coscat 83 | 0.02 | | 0.25 |

| Experiment | Cream time in [sec] | Tack free time [sec] | Shore-A hardness measured × min after demolding | | | | Shore-A hardness 24 h after demolding | Puncture expansion in mm after b = 60,000 bends |
|---|---|---|---|---|---|---|---|---|
| | | | after 0 min | after 2 min | after 10 min | after 60 men | | |
| 19 | 11 | 20 | 30 | 35 | 42 | 48 | 53 | 60000*/11.9 |
| 20 | 9 | 20 | 35 | 40 | 47 | 52 | 55 | 60000*/1.31 |
| 21 | 10 | 24 | 35 | 40 | 46 | 50 | 53 | 7.7/6.2 |
| 22 | 11 | 26 | 34 | 39 | 45 | 47 | 52 | 60000*/6.2 |
| 23 | 11 | 39 | 31 | 36 | 46 | 51 | 52 | 4.5/4.0 |

All values marked with * indicate the number b of bends after which a test strip was broken.

TABLE 8

Use of Ti and Li and Bi catalysts in various amounts

| | Lithium component | | Titanium component | | Bismuth component | | | |
|---|---|---|---|---|---|---|---|---|
| Experiment | Name | Amount in wt. % | Name | Amount in wt. % | Name | Amount in wt. % | [nTi:nLi] | nBi:(nTi + nLi) |
| 24 | | | | | Coscat 83 | 0.1 | | 0 |
| 25 | Li-2-Hex Cem | 0.04 | Tyzor AA 95 | 0.04 | Coscat 83 | 0.02 | 0.92 | 0.07 |
| 26 | Li-2-Hex Cem | 0.026 | Tyzor AA 95 | 0.026 | Coscat 83 | 0.046 | 0.92 | 0.25 |
| 27 | Li-2-Hex Cem | 0.036 | Tyzor AA 95 | 0.036 | Coscat 83 | 0.028 | 0.92 | 0.11 |
| 28 | Li-2-Hex Cem | 0.042 | Tyzor AA 95 | 0.042 | Coscat 83 | 0.015 | 0.92 | 0.05 |
| 29 | Li-2-Hex Cem | 0.046 | Tyzor AA 95 | 0.046 | Coscat 83 | 0.008 | 0.92 | 0.03 |
| 30 | Li-2-Hex Cem | 0.05 | Tyzor AA 95 | 0.05 | | | 0.92 | |

TABLE 8-continued

Use of Ti and Li and Bi catalysts in various amounts

| Experiment | Cream time in [sec] | Tack free time [sec] | Shore-A hardness measured × min after demolding | | | | Shore-A hardness 24 h after demolding | Puncture expansion in mm after b = 60,000 bends |
| | | | after 0 min | after 2 min | after 10 min | after 60 men | | |
| --- | --- | --- | --- | --- | --- | --- | --- | --- |
| 24 | 10 | 35 | 28 | 35 | 47 | 50 | 55 | 1.6/1.7 |
| 25 | 10 | 24 | 35 | 40 | 46 | 50 | 53 | 7.7/6.2 |
| 26 | 8 | 23 | 37 | 43 | 50 | 53 | 57 | 3.3/4.4 |
| 27 | 8 | 22 | 37 | 42 | 50 | 54 | 56 | 4.6/3.2 |
| 28 | 10 | 28 | 34 | 39 | 46 | 50 | 56 | 9.2/4.0 |
| 29 | 9 | 25 | 35 | 40 | 49 | 51 | 57 | 60000*/13.6 |
| 30 | 10 | 22 | 33 | 38 | 47 | 50 | 53 | 3.4/3.6 |

All repeated flexural test results marked with * displayed fracture after b bends
All elastomer sheets in the experiments marked with # were not dimensionally stable after demolding. The sheets buckled.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane elastomer prepared by reacting (a) an organic diisocyanate or a polyisocyanate with (b) at least one polyether polyol having a number-average molecular weight of 800 g/mol to 25,000 g/mol and an average functionality of 1.6 to 2.4, (c) optionally at least one polyether polyol differing from (b) and having a number-average molecular weight of 800 g/mol to 25,000 g/mol and an average functionality of 2.4 to 8, (d) optionally at least one polymer polyol containing 1 to 50 wt. % filler, relative to the polymer polyol, and having a hydroxyl value of 10 to 149 and an average functionality of 1.8 to 8, and (e) optionally at least one low-molecular chain extender having an average functionality of 1.8 to 2.1 and a molecular weight of up to 750 g/mol and/or at least one crosslinking agent having an average functionality of 3 to 4 and a molecular weight of up to 750 g/mol, in the presence of (f) at least one amine catalyst, and a catalyst mixture comprising
      (i) at least one organic titanium and/or zirconium compound, and
      (ii) at least one organic lithium carboxylate, and
      (iii) optionally at least one organic bismuth carboxylate,
         wherein the ratio of titanium ions and/or zirconium ions in component (f)(i) to lithium ions in component (f)(ii) is 0.2:1 to 4:1, (g) optionally at least one blowing agent, and (h) optionally at least one additive.

2. The polyurethane elastomer according to claim 1, wherein component (d) contains 1 to 45 wt. % filler.

3. The polyurethane elastomer according to claim 1, wherein the catalyst mixture comprises 0.001 to 10 wt. %, relative to the total quantity of components (b), (c), (d), (e), (f)(i), (f)(ii), (f)(iii), (g) and (h).

4. The polyurethane elastomer according to claim 1, wherein the catalyst mixture comprises (f)(i), (f)(ii) and (f)(iii).

5. The polyurethane elastomer according to claim 4, wherein the ratio of bismuth ions in component (f)(iii) to the sum of titanium ions, zirconium ions and lithium ions is 0.0001:1 to 0.53:1.

6. The polyurethane elastomer according to claim 1, wherein the catalyst mixture comprises (f)(i) and (f)(ii).

7. The polyurethane elastomer according to claim 1, wherein component (a) comprises a prepolymer comprising 4,4'-diphenylmethane diisocyanate or 4,4'-diphenylmethane diisocyanate modified by carbodiimidization and one or more polyether polyols having a hydroxyl value of 10 to 112, optionally with at least one polyethylene glycol or polypropylene glycol having a molecular weight of 135 g/mol to 700 g/mol.

8. A process for the production of polyurethane elastomers comprising the step of reacting (a) an organic diisocyanate or a polyisocyanate with (b) at least one polyether polyol having a number-average molecular weight of 800 g/mol to 25,000 g/mol and an average functionality of 1.6 to 2.4, (c) optionally at least one polyether polyol differing from (b) and having a number-average molecular weight of 800 g/mol to 25,000 g/mol and an average functionality of 2.4 to 8, (d) optionally at least one polymer polyol containing 1 to 50 wt. % filler, relative to the polymer polyol, and having a hydroxyl value of 10 to 149 and an average functionality of 1.8 to 8, (e) optionally at least one low-molecular chain extender having an average functionality of 1.8 to 2.1 and a molecular weight of up to 750 g/mol and/or at least one crosslinking agent having an average functionality of 3 to 4 and a molecular weight of up to 750 g/mol, in the presence of (f) at least one amine catalyst and a catalyst mixture comprising
      (i) at least one organic titanium and/or zirconium compound,
      (ii) at least one organic lithium carboxylate,
      (iii) optionally additionally at least one organic bismuth carboxylate,
         wherein the ratio of titanium ions and/or zirconium ions in component (f)(i) to lithium ions in component (f)(ii) is 0.2:1 to 4:1, (g) optionally at least one blowing agent, and (h) optionally at least one additive.

9. The process according to claim 8, wherein the ratio of bismuth ions in component (f)(iii) to the sum of titanium ions, zirconium ions and lithium ions is 0.0001:1 to 0.53:1.

10. An elastomeric molded part, prepared by reacting
(a) an organic diisocyanate or a polyisocyanate with
(b) at least one polyether polyol having a number-average molecular weight of 800 g/mol to 25,000 g/mol and an average functionality of 1.6 to 2.4,
(c) optionally at least one polyether polyol differing from (b) and having a number-average molecular weight of 800 g/mol to 25,000 g/mol and an average functionality of 2.4 to 8,
(d) optionally at least one polymer polyol containing 1 to 50 wt. % filler, relative to the polymer polyol, and having a hydroxyl value of 10 to 149 and an average functionality of 1.8 to 8,
(e) optionally at least one low-molecular chain extender having an average functionality of 1.8 to 2.1 and a molecular weight of up to 750 g/mol and/or at least one crosslinking agent having an average functionality of 3 to 4 and a molecular weight of up to 750 g/mol, in the presence of
(f) at least one amine catalyst and a catalyst mixture comprising
  (i) at least one organic titanium and/or zirconium compound,
  (ii) at least one organic lithium carboxylate, and
  (iii) optionally at least one organic bismuth carboxylate,
    wherein the ratio of titanium ions and/or zirconium ions in component (f)(i) to lithium ions in component (f)(ii) is 0.2:1 to 4:1,
(g) optionally at least one blowing agent, and
(h) optionally at least one additive.

11. The elastomeric molded part according to claim 10, wherein the molded part comprises a shoe sole.

12. The shoe sole according to claim 11, having a density ranging from about 180 to about 1100 kg/m$^3$.

* * * * *